(12) United States Patent
Allam

(10) Patent No.: US 7,415,028 B1  
(45) Date of Patent: Aug. 19, 2008

(54) METHOD AND SYSTEM FOR OPTIMIZING ROUTING TABLE CHANGES DUE TO ARP CACHE INVALIDATION IN ROUTERS WITH SPLIT PLANE ARCHITECTURE

(75) Inventor: Bhasker Allam, Fremont, CA (US)

(73) Assignee: Network Equipment Technologies, Inc., Fremont, CA (US)

( * ) Notice: Subject to any disclaimer, the term of this patent is extended or adjusted under 35 U.S.C. 154(b) by 1040 days.

(21) Appl. No.: 10/364,965

(22) Filed: Feb. 11, 2003

(51) Int. Cl.
*H04L 12/28* (2006.01)
*H04L 12/56* (2006.01)

(52) U.S. Cl. ............................. 370/395.54; 370/401
(58) Field of Classification Search .................. None
See application file for complete search history.

(56) References Cited

U.S. PATENT DOCUMENTS

| | | | | |
|---|---|---|---|---|
| 5,309,437 | A * | 5/1994 | Perlman et al. | 370/401 |
| 2003/0140283 | A1 * | 7/2003 | Nishio | 714/43 |
| 2004/0109457 | A1 * | 6/2004 | Johnson et al. | 370/401 |
| 2004/0131079 | A1 * | 7/2004 | Hegde et al. | 370/466 |
| 2006/0107108 | A1 * | 5/2006 | Geng et al. | 714/11 |

* cited by examiner

*Primary Examiner*—Melvin Marcelo
*Assistant Examiner*—Clemence Han
(74) *Attorney, Agent, or Firm*—Townsend and Townsend and Crew

(57) ABSTRACT

A method for optimizing routing functions in a router is provided. The router has a split plane architecture including a control plane and a data plane. The control plane includes an Address Resolution Protocol cache and the data plane includes a programmable forwarding information base. According to one aspect, when the control plane obtains information about a route, it evaluates the obtained information about the route to determine if address resolution is needed. If it is determined that address resolution is needed for the route, the control plane performs the needed address resolution to derive additional information about the route. The control plane programs the forwarding information base to incorporate the obtained and additional information. The determination as to whether address resolution is needed for the route is performed regardless of whether packets are to be delivered on the route.

29 Claims, 1 Drawing Sheet

METHOD AND SYSTEM FOR OPTIMIZING ROUTING TABLE CHANGES DUE TO ARP CACHE INVALIDATION IN ROUTERS WITH SPLIT PLANE ARCHITECTURE

BACKGROUND OF THE INVENTION

The present invention generally relates to routing in computer networks and, more specifically, to a method and system for optimizing routing functions in routers with a split plane architecture.

A router typically has three basic components, namely, a routing table, a forwarding information base (FIB) and an address resolution protocol (ARP) cache. The routing table contains information relating to routers that are present on a computer network. The FIB contains information that is necessary to forward an Internet Protocol (IP) datagram to its intended destination, i.e., the FIB contains information on paths or routes that can be used to forward the IP datagram. The ARP cache includes information relating to mappings from IP addresses to corresponding hardware addresses. ARP provides a dynamic mapping between two different forms of addresses: an IP address and whatever type of address a data link uses. ARP is used to resolve a layer-3 IP address to a layer-2 MAC address.

In a software based router, when a datagram or packet needs to be forwarded, the router consults the FIB. Once a route for the packet is identified, the router then consults the ARP cache to retrieve the MAC address of the next hop gateway or host. If a corresponding MAC address is located in the ARP cache, the packet is forwarded to the next hop gateway using the corresponding MAC address. Otherwise, an ARP request is initiated to resolve the needed corresponding MAC address. A reply to the ARP request from the next hop gateway provides the needed corresponding MAC address that can then be used to forward the packet. An appropriate entry linking the IP address and the corresponding MAC address is then stored in the ARP cache. Subsequent packets that need to pass through the same gateway can be quickly forwarded using the recently added entry in the ARP cache. To account for gateways or hosts that become unavailable, the ARP cache entries are invalidated after a predetermined period of time. This prevents the router from forwarding packets to a gateway or host that is not operational, thereby minimizing waste of network resources. At the same time, periodic invalidation of the ARP cache entries also saves precious memory resources of the router as the router no longer has to maintain any information relating to the next hop.

In traditional software based routers, the functions of the three basic components of the router are performed by software. Recently, due to advances in hardware technologies, many router vendors have utilized a split plane architecture which segregates or splits the forwarding functions from the routing functions. In other words, the split plane architecture includes a control plane and a data plane. The control plane determines and controls how a packet is to be routed or forwarded; and the data plane performs the actual forwarding of the packet. With the split plane architecture, the forwarding functions are implemented in hardware, for example, network processors, in order to achieve line rate forwarding as high as, for example, OC-48 or even OC-192. However, the split plane architecture has its own set of issues that are not present in the traditional software based routers.

One of the common problems encountered in the split plane architecture is, for example, delay in determination of routes. In the split plane architecture, the hardware (for example, the network processor) requires that all information that is necessary for forwarding a packet be programmed in advance before the packet arrives for delivery to its intended destination. As a result, routes traversing a gateway, whose ARP cache entries are not resolved, are not programmed. When a packet is received for delivery to an intended destination for which the ARP is not resolved, the network processor forwards the packet to the control plane which, in turn, generates an ARP request. As a result, upon the arrival of a packet intended for a particular destination whose ARP is not resolved, ARP needs to be engaged and the proper route entries need to be programmed, thereby incurring delay in the delivery of the packet. Once the ARP is resolved, the route entries are programmed with the complete information. Subsequent packets can then be forwarded by the network processor without any assistance from the control plane. One drawback of performing address resolution only upon arrival of a packet is that the packet cannot be delivered while address resolution is being performed. That increases the likelihood of losing that packet. For example, on a 10 Mbps pipe, a network processor can forward about 20,000 packets/sec (each packet being 64 bytes long). It takes about 1-2 seconds to resolve an ARP entry. During this 1-2 second period, the number of packets lost can reach about 20,000 to 40,000 packets for each route that does not have an ARP entry resolved.

Another common problem encountered in the split plane architecture is ARP cache invalidation. As previously mentioned, ARP cache entries are periodically invalidated. Hence, when an ARP cache entry times out or becomes invalidated, all the route entries in the network processor that relate to that particular ARP cache entry have to be flushed or deleted. Consequently, the ARP cache entry has to be re-learned again and the corresponding routes reprogrammed again in the network processor. The re-learning and reprogramming operations consume significant CPU resources and time. Empirically, it has been shown that it takes about 2-3 minutes to program 5000 routes. During this time, packets received for routes that have not been programmed are either dropped or sent to the CPU, thereby negatively affecting forwarding performance.

Hence, it would be desirable to provide a method and system that is capable of optimizing route determination and routing table changes due to ARP cache invalidation in routers with a split plane architecture.

BRIEF SUMMARY OF THE INVENTION

A method for optimizing routing functions in a router is provided. The router has a split plane architecture having a control plane and a data plane. The control plane is implemented in software and the data plane is implemented in hardware. The control plane includes an Address Resolution Protocol (ARP) cache and the data plane includes a programmable forwarding information base (FIB). According to one exemplary aspect, when the control plane obtains information about a route, it evaluates the obtained information about the route to determine if address resolution is needed. If it is determined that address resolution is needed for the route, the control plane performs the needed address resolution to derive additional information about the route. Upon derive the additional information, the control plane programs the forwarding information base to incorporate the obtained and additional information. The determination as to whether address resolution is needed for the route is performed regardless of whether packets are to be delivered on the route.

According to another exemplary aspect, each entry in the ARP cache is refreshed before it expires. If the refreshing of the entry elicits a response, the entry is reset for expiration. If the response is not received, the entry is allowed to expire after a predetermined time period. Corresponding entries in the forwarding information based are then updated to reflect and effectuate removal of the expired entry.

Reference to the remaining portions of the specification, including the drawings and claims, will realize other features and advantages of the present invention. Further features and advantages of the present invention, as well as the structure and operation of various embodiments of the present invention, are described in detail below with respect to accompanying drawings, like reference numbers indicate identical or functionally similar elements.

DETAILED DESCRIPTION OF THE INVENTION

Figure 1:
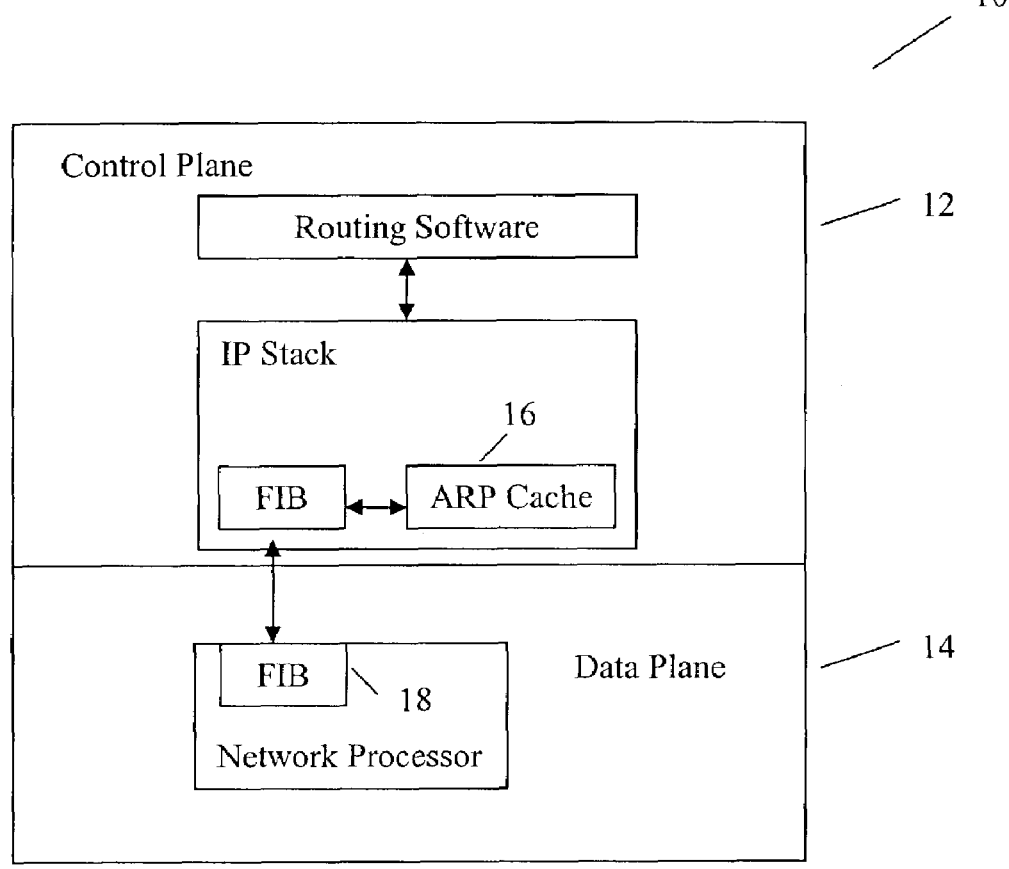
FIG. 1 is a simplified block diagram illustrating the architecture of a router in which an exemplary embodiment of the present invention can be deployed.

The present invention in the form of one or more exemplary embodiments will now be described. FIG. 1 is a simplified block diagram illustrating the architecture of a router 10 in which an exemplary embodiment of the present invention can be deployed. The router 10 includes a control plane 12 and a data plane 14. The control plane 12 and the data plane 14 further include an ARP cache 16 and a forwarding information base (FIB) 18 respectively. In an exemplary embodiment, the control plane 12 also includes a FIB. The FIB in the control plane 12 is used as a buffer to store updated routing or forwarding information which is periodically uploaded to the FIB 18 in the data plane 14. In other embodiments, the control plane 12 may not include a FIB. According to an exemplary embodiment, the control plane 12 is implemented using software in the form of control logic and the data plane 18 is implemented using hardware, such as, a network processor and the like. The control plane 12 determines and controls routing and/or forwarding of packets by controlling the data plane 14. The data plane 14 performs the actual forwarding of the packets. Furthermore, the FIB 18 is implemented using a programmable memory. The FIB 18 contains entries corresponding to routing or forwarding information relating to various paths or routes. An FIB entry, for example, links a layer-3 or IP address to a corresponding layer-2 or physical/hardware address. The FIB 18 is dynamically updated on a periodic basis. For example, the FIB in the control plane 12 which contains updated routing or forwarding information can be uploaded to the FIB 18 in the data plane. For packets for which complete routing information is available in the FIB 18, these packets are directly routed by the data plane 14 without any assistance from the control plane 12.

According to one exemplary embodiment, the control plane 12 seeks to provide address resolution for a route using ARP as soon as it is learned that the route needs ARP resolution, regardless of whether packets are to be delivered on that route. For example, as soon as a route is programmed into the FIB 18, the control logic controlling the FIB 18 checks to see if address resolution is needed for a gateway or host of the route that has just been programmed. If address resolution is needed, the control plane 12 promptly sends out an ARP request to resolve the route. Upon receiving the requested information from a reply to the ARP request, the FIB 18 is updated to incorporate the requested information into the corresponding route. Alternatively, the FIB 18 can be programmed to include the initially received route information and the requested information upon conclusion of the address resolution. The address resolution is performed regardless of whether a packet is pending delivery on that route. In other words, the control plane 12 does not wait until a packet is to be delivered on that route before performing the requisite address resolution. Instead, the decision to perform address resolution is triggered by the control plane 12 learning about the route and not by receipt of a packet that is to be delivered on that route. Packets that are subsequently received for delivery on that route can then be forwarded directly by the data plane 14 without requiring the control plane 12 to perform any unnecessary processing. As a result, by advancing the address resolution, the number of packets coming into the control plane 12 is reduced, thereby providing improved forwarding performance. Moreover, packets whose deliveries are put on hold during the time period when address resolution is being performed are more susceptible to loss. By advancing address resolution before a packet is required to be sent, packet loss is also reduced.

According to another exemplary aspect, in order to reduce ARP cache invalidation, each entry in the ARP cache 16 is refreshed every ($\frac{3}{4}$*N) seconds after its initial addition to the ARP cache, where N is the number of seconds when the ARP entry expires or times out from the time it was added. In other words, if the ARP entry was added at time t and the ARP entry is to be timed out at t+N seconds, then the ARP entry is refreshed at t+($\frac{3}{4}$*N) seconds. The factor "$\frac{3}{4}$" is predetermined based on system design requirements and constraints and may vary. Based on the teachings and disclosure provided herein, a person of ordinary skills in the art will know how to employ other values for this factor.

The purpose of refreshing the ARP entry is to elicit a response from the gateway or host that corresponds to the ARP entry prior to its pending expiration. The response indicates that the corresponding gateway or host is still available and operational. Refreshing the ARP entry involves sending out an ARP request. If the corresponding host or gateway responds to the ARP request, the timer that is used to keep track of expiration of that ARP entry is reset. Otherwise, the ARP entry is allowed to time out naturally after N seconds. Since memory is relatively inexpensive, the cost of maintaining additional ARP entries which would have otherwise timed out would not be prohibitive. Furthermore, by maintaining ARP entries that are still valid (but otherwise have been inactive for a period of time), the need to flush or reprogram the FIB 18 is minimized, thereby allowing valid routes to be maintained longer. When valid routes are present, traffic loss is minimized as well, thus providing improved forwarding performance.

It is understood that the examples and embodiments described herein are for illustrative purposes only and that various modifications or changes in light thereof will be suggested to persons skilled in the art and are to be included within the spirit and purview of this application and scope of the appended claims. All publications, patents, and patent applications cited herein are hereby incorporated by reference for all purposes in their entirety.

What is claimed is:

1. A method for optimizing routing functions in a router having a split plane architecture, the split plane architecture having distinct control and data planes coupled to exchange routing information, the control plane being implemented in software and the data plane being implemented in hardware, the control plane further including an Address Resolution Protocol (ARP) cache and the data plane further including a programmable forwarding information base, comprising:

obtaining information about a route by which the router forwards packets to a destination address;

evaluating the obtained information about the route to determine if address resolution is needed for the route;

if it is determined that address resolution is needed for the route, performing the needed address resolution to derive additional information about the route; and programming the forwarding information base to incorporate the obtained and additional information about the route such that packets can be forwarded to the destination address using the route;

wherein the determination as to whether address resolution is needed for the route is responsive to obtaining information about the route and is performed regardless of whether packets are received for delivery on the route.

2. The method of claim 1, wherein the ARP cache includes a plurality of entries, each entry being set to expire after a predetermined time period after its addition to the ARP cache, the method further comprising:

refreshing an entry in the ARP cache before it expires to elicit a response;

if the response is received, resetting the entry; and if the response is not received, allowing the entry to expire after the predetermined time period has elapsed.

3. The method of claim 2 wherein refreshing the entry further comprises:

sending out an ARP request that corresponds to the entry.

4. The method of claim 2 wherein refreshing the entry further comprises:

refreshing the entry periodically every (A*N) seconds, wherein A is a proper fraction and N is number of seconds in the predetermined time period.

5. The method of claim 4 wherein A has a value of "¾".

6. The method of claim 2 further comprising:

upon allowing the entry to expire after the predetermined time period has elapsed, reprogramming the forwarding information base to remove one or more entries corresponding to the expired entry.

7. The method of claim 2 wherein each entry in the ARP cache includes information linking a layer-3 address to a layer-2 address.

8. The method of claim 1 wherein the address resolution is performed using Address Resolution Protocol (ARP).

9. The method of claim 1 wherein the additional information about the route includes information relating to a layer-2 address.

10. The method of claim 1 wherein the data plane is includes a network processor.

11. A method for optimizing routing functions in a router having a split plane architecture, the split plane architecture having distinct control and data planes coupled to exchange routing information, the control plane being implemented in software and the data plane being implemented in hardware, the control plane further including an Address Resolution Protocol (ARP) cache and the data plane further including a programmable forwarding information base, comprising:

learning information about a route by which the router forwards packets to a destination address;

programming the forwarding information base to incorporate the learned information about the route;

evaluating the learned information about the route to determine if address resolution is needed for the route;

if it is determined that address resolution is needed for the route, performing the needed address resolution to derive additional information about the route such that packets can be forwarded to the destination address using the route; and programming the forwarding information base to further incorporate the additional information about the route;

wherein the determination as to whether address resolution is needed for the route is responsive to learning information about the route and, if it is determined to be needed, is performed, prior to arrival of a packet for delivery to its intended destination using the route.

12. The method of claim 11, wherein the ARP cache includes a plurality of entries, each entry being set to expire after a predetermined time period after its addition to the ARP cache, the method further comprising:

refreshing an entry in the ARP cache before it expires to elicit a response;

if the response is received, resetting the entry; and if the response is not received, allowing the entry to expire after the predetermined time period has elapsed.

13. The method of claim 12 wherein refreshing the entry further comprises:

sending out an ARP request that corresponds to the entry.

14. The method of claim 12 wherein refreshing the entry further comprises:

refreshing the entry periodically every (A*N) seconds, wherein A is a proper fraction and N is number of seconds in the predetermined time period.

15. The method of claim 14 wherein A has a value of "¾".

16. The method of claim 12 further comprising:

upon allowing the entry to expire after the predetermined time period has elapsed, reprogramming the forwarding information base to remove one or more entries corresponding to the expired entry.

17. The method of claim 12 wherein each entry in the ARP cache includes information linking a layer-3 address to a layer-2 address.

18. The method of claim 11 wherein the address resolution is performed using Address Resolution Protocol (ARP).

19. The method of claim 11 wherein the additional information about the route includes information relating to a layer-2 address.

20. The method of claim 1 wherein the data plane includes a network processor.

21. A router comprising:

a control plane implemented in software and configured to:

maintain an Address Resolution Protocol (ARP) cache having a plurality of entries, learn information about a route by which the router forwards packets to a destination address, evaluate the learned information about the route to determine if address resolution is needed for the route; and perform the needed address resolution to derive additional information for the route such that packets can be forwarded to the destination address using the route, if it is determined that address resolution is needed; and a data plane implemented in hardware and configured to handle packet forwarding, the data plane including a programmable forwarding information base;

wherein the control plane is further configured to program the forwarding information base to incorporate the learned and additional information about the route; and wherein the determination as to whether address resolution is needed for the route is performed in response to learning the information and regardless of whether packets are received for delivery on the route.

22. The router of claim 21 wherein each entry in the ARP cache is set to expire after a predetermined time period after its addition to the ARP cache;
   wherein the control plane is further configured to:
      refresh an entry in the ARP cache before it expires to elicit a response,
      if the response is received, reset the entry, and
      if the response is not received, allow the entry to expire after the predetermined time period has elapsed.

23. The router of claim 22 wherein the control plane refreshes the entry by sending out an ARP request that corresponds to the entry.

24. The router of claim 22 wherein the entry is refreshed periodically every (A*N) seconds, where A is a proper fraction and N is number of seconds in the predetermined time period.

25. The router of claim 24 wherein A has a value of "¾".

26. The router of claim 22 wherein the control plane is further configured to, upon allowing the entry to expire after the predetermined time period has elapsed, reprogram the forwarding information base to remove one or more entries corresponding to the expired entry.

27. The router of claim 22 wherein each entry in the ARP cache includes information linking a layer-3 address to a layer-2 address.

28. The router of claim 21 wherein the address resolution is performed using Address Resolution Protocol.

29. The router of claim 21 wherein the data plane includes a network processor.

* * * * *